H. OPGENORTH.
BOX FOR BERRIES AND THE LIKE.
APPLICATION FILED MAY 26, 1919.
1,334,046.
Patented Mar. 16, 1920.
3 SHEETS—SHEET 1.
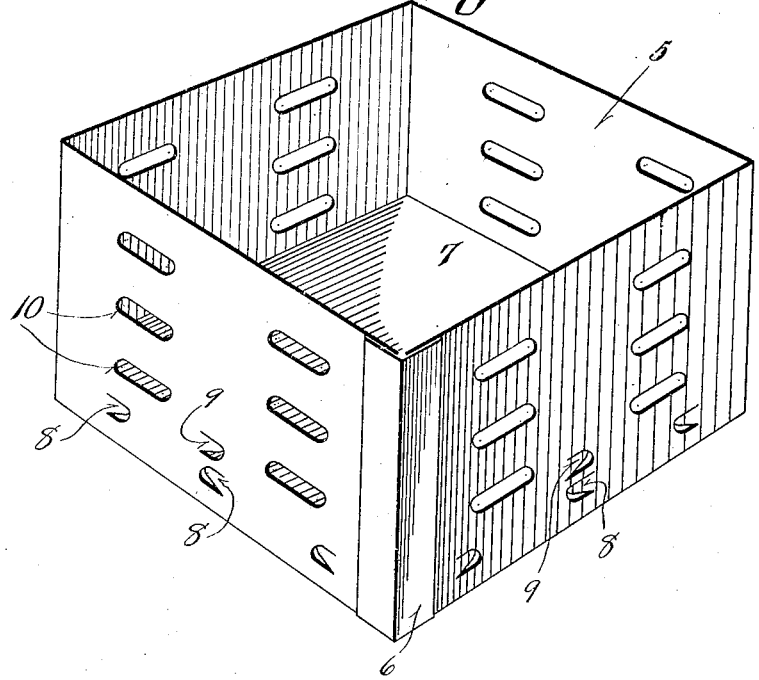
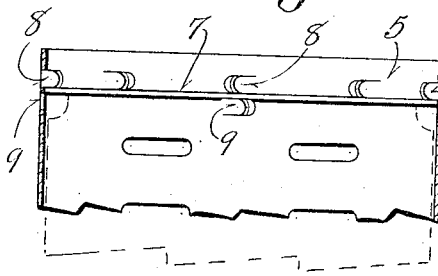
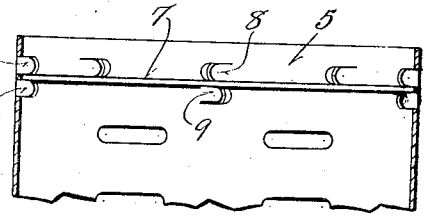
WITNESS
T. F. Britt
INVENTOR
Henry Opgenorth
BY
Young & Young
ATTORNEYS

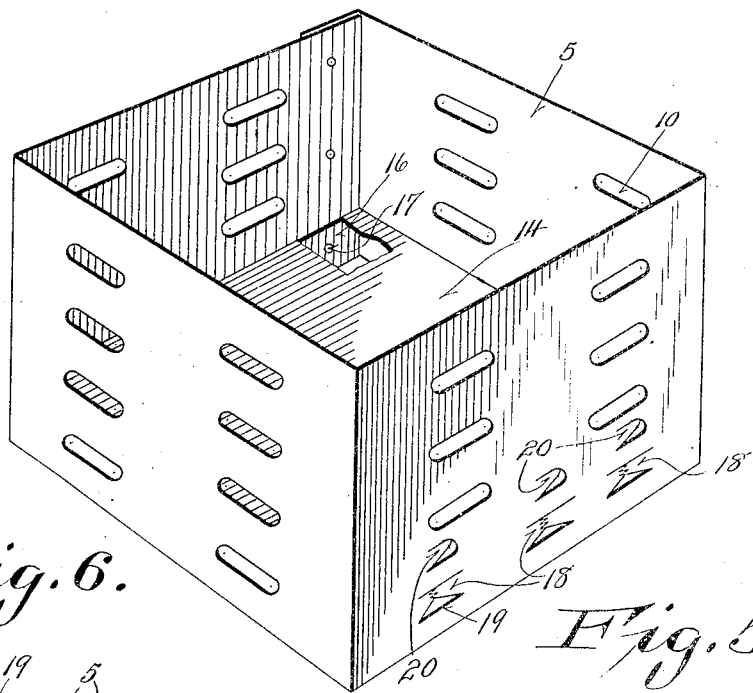
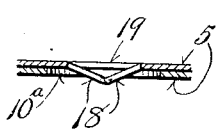
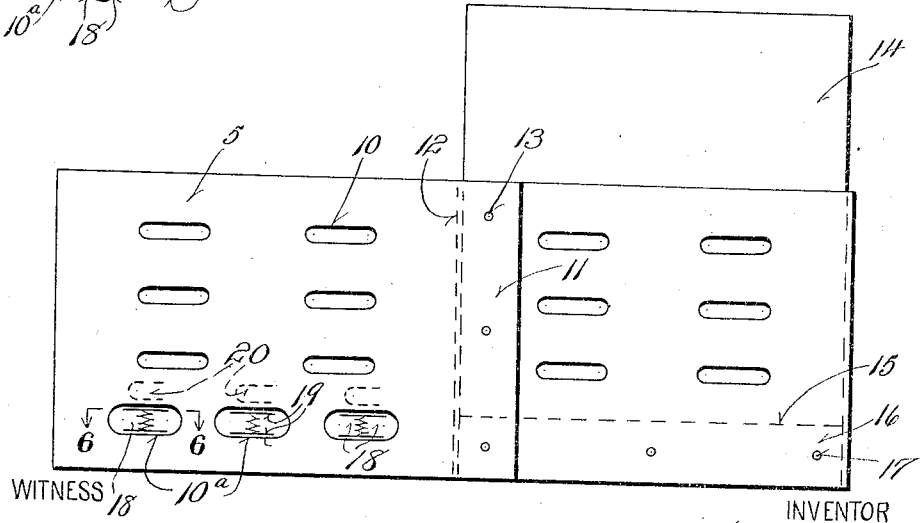

H. OPGENORTH.
BOX FOR BERRIES AND THE LIKE.
APPLICATION FILED MAY 26, 1919.

1,334,046.

Patented Mar. 16, 1920.
3 SHEETS—SHEET 3.

INVENTOR
Henry Opgenorth

WITNESS
T. P. Britt

BY
Young & Young
ATTORNEYS

UNITED STATES PATENT OFFICE.

HENRY OPGENORTH, OF SHEBOYGAN, WISCONSIN.

BOX FOR BERRIES AND THE LIKE.

1,334,046.	Specification of Letters Patent.	Patented Mar. 16, 1920.

Application filed May 26, 1919. Serial No. 299,849.

*To all whom it may concern:*

Be it known that I, HENRY OPGENORTH, a citizen of the United States, and resident of Sheboygan, in the county of Sheboygan and State of Wisconsin, have invented certain new and useful Improvements in Boxes for Berries and the like; and I do hereby declare that the following is a full, clear, and exact description thereof.

My invention relates to new and useful improvements in boxes for containing berries and similar articles, and more particularly of that foldable type including hingedly connected walls and a bottom which may be secured in place after the walls have been expanded from their flat shape which affords a minimum amount of space for the boxes in shipping empty.

It is in general the object of my invention to simplify and otherwise improve the structure and to increase the convenience with which said boxes may be set up from their flat shape.

More particularly, it is my object to provide holding tabs for the bottom which may be struck from the walls of the box to procure a decided economy in manufacture as well as a maximum convenience in securing the bottom in place.

It is still further my object to provide means for affording ventilation and ready inspection of the contents of the box, which at the same time serves to prevent warping of the box walls.

With the above and other objects and advantages in view, which will be apparent as the description proceeds, my invention resides in the novel features of construction, combination and arrangement of parts which will be hereinafter more particularly described and defined by the appended claims.

In the accompanying drawings:

Figure 1 is a perspective view of a setup box constructed in acordance with my invention.

Fig. 2 is a detail sectional view through the box showing the initial step in setting up the box.

Fig. 3 is a similar view showing the next and final step in setting up the box.

Fig. 4 is a perspective view of a modified box structure in open position.

Fig. 5 is an elevational view of a modified form of box folded.

Fig. 6 is a detail sectional view on the line 6—6 of Fig. 5.

Figure 7:
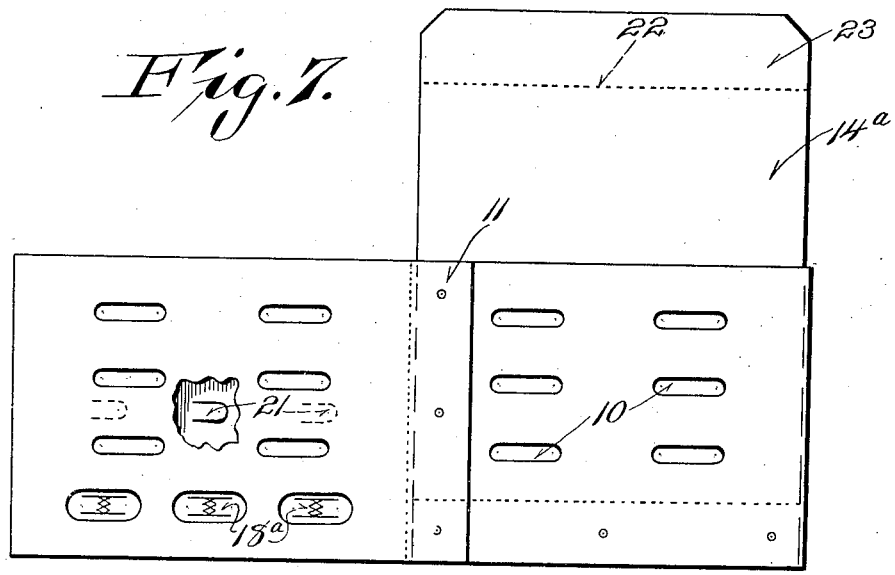
Fig. 7 is an elevational view of a further modified form of box in folded position.

Referring now more particularly to the drawings, the box shown in Fig. 1 and constituting one embodiment of my invention comprises four walls 5 preferably formed of a single elongated strip of sheet wood bent on transverse score lines, the ends of the strip being secured together by a binder strip 6 pasted thereto and preferably formed of tough paper. The bottom of the box comprises a simple rectangular sheet 7 of such size as to fit within the confines of the wall, and in shipping the box, the walls are collapsed or folded together and the bottom is separate therefrom. To secure the bottom in place when the box is set up for use, a series of seating tabs 8 are struck inwardly from the lower portions of the walls, the lower portions of the walls being cut on substantially U-shaped lines to define said tabs. The walls are also cut above the plane of the tabs 8 to provide tabs 9 which are struck inwardly after the bottom is engaged with the tabs 8, to thus retain said bottom in place and hold the box in set-up or open position.

In assembling the box, the bottom 8 is set upon a suitable form or support as shown in Fig. 2, the walls of the box are then opened up in inverted position, with the tabs 8 struck inwardly and lowered onto the form to seat the tabs on the bottom. The tabs 9 are then struck inwardly under the bottom and the assembled box is then removed.

An exceedingly simple structure and operation is thus provided whereby a box of this character may be shipped in the flat shape and then set up and assembled for use. In manufacturing the wall portions of the box, the tabs 8 are struck inwardly as they are formed and the only assembling operation necessary other than placing the parts in their relative positions is to punch in the tabs 9.

Each of the walls of the box is provided with series of slots 10 extending longitudinally of its top and bottom edges and these slots provide for ready inspection of the contents of the box, thus avoiding the necessity of dumping the contents of the box for inspection. The slots also provide free ventilation for the contents of the box, as is highly desirable, and they possess the further function of preventing warping of the walls of the box, by interrupting the lines of warping stresses.

In the modified structure shown in Figs. 4 to 6, the body strip of the box walls 5 is provided at one end with a valance flap 11 separated therefrom by a score line 12 and secured by any suitable fastener members 13 to the other end of the strip to form the connection of the walls. The walls of this modified structure are also provided with the openings 10. The bottom 14 of the box is secured at 15 adjacent one edge to provide a flap 16 which is secured to one of the walls at the time of manufacturing the box, by suitable fastener members 17, it being incidentally noted that one of the wall securing fastener members 13 also affords securement of the bottom flap 16, and in the folded position of the box walls, the bottom lies flat between a pair of the walls. For supporting the bottom in the open position of the box, tabs 18 are struck inwardly from the lower portion of the wall opposite the one to which the flap 16 is secured. In forming these tabs, the box wall is slit on parallel lines 19 and pressure is applied by a blunt instrument between the central portions of the slits thus producing a jagged tear and forming a pair of tabs whose free ends meet in a series of interlaced projections which tend to prevent movement of the tabs back into the plane of the walls upon possible pressure exerted thereon in the folded position of the box. The wall of the box which is opposite the tabs in this folded position is provided with a series of slots 10$^a$ which receive the tabs and thus further tend to prevent collapse thereof back into the plane of the wall, whereby a proper seating action of said tabs for the box bottom is insured when the walls are spread apart. Holding tabs 20, similar to the tabs 9 are provided in the wall above the tabs 18 and are struck inwardly when the bottom 14 is seated on said tabs 18. This modified structure, may obviously be more readily set up in open position for use than the structure of Fig. 1.

Figure 8:
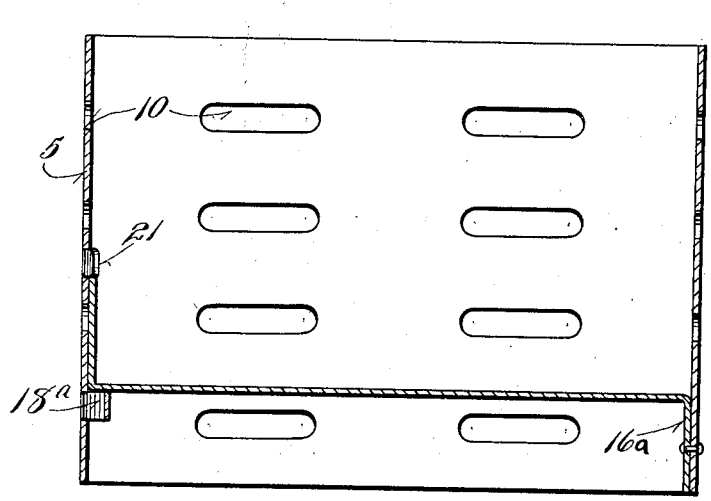
Fig. 8 is a sectional view, in set up position, of the box shown in Fig. 7.

Figs. 7 and 8 show a still further form of box wherein is avoided the necessity of striking in tab portions of the box incidental to setting it up in open position. In further modified structure, the body strip of the box walls 5 has its ends secured together by the usual valance flap 11 and the bottom 14$^a$ is secured by its flap 16$^a$ to one of the walls at the time of manufacturing the box, in a similar manner. The box wall opposite the end to which the bottom is secured is provided with the tabs 18$^a$ for seating the free portion of the bottom, and a second series of tabs 21, similar to the tabs 20 of the aforedescribed structures have formed in said walls, these tabs being spaced a considerable distance above the tabs 18. These tabs are struck inwardly during the manufacture of the box to form projections on the inner face of the wall. The free edge portion of the bottom 14$^a$ is scored on a line 22 to provide a latching flap 23.

In assembling this box structure, the walls 5 are opened and the bottom 14$^a$ is swung outwardly into the confines of the wall, the flap 23 of the bottom being bent inwardly in this movement by engagement of the box wall opposite the end to which the bottom is initially secured. As the bottom seats on the tabs 18$^a$, the edge of the flap 23 will move past the previously inwardly struck tabs 21, and will spring under the tabs thus procuring an effective latch which will hold the bottom securely in place against relative movement of any direction, and hold the box in open position. It is noted that the arc of swinging movement of the free edge of the bottom proper is such as to provide clearance for the tabs 21. The box may thus be set up in open position in a most ready manner and without necessitating the use of forms or bending tools.

What is claimed is—

1. A box for berries and like articles comprising a foldable wall structure, tabs struck inwardly from the lower intermediate portions of said wall structure, a bottom insertible in the wall structure and adapted to seat on said tabs and said wall structure being provided with series of slots extending longitudinally of the top and bottom edges of the walls to afford sight and ventilation openings in the walls and to prevent warping of said walls, certain of said slots being adapted to receive the inwardly struck tabs upon folding the wall structure.

2. A box of the character described comprising a foldable wall structure, a series of tabs struck inwardly from lower portions of the wall structure intermediately of the meeting edges of the walls, said tabs being disposed in a common plane, and a bottom adapted to seat on said tabs, said wall structure being cut on U-shaped lines above the first named tabs to define holding tabs for preventing movement of the bottom upon seating engagement of the bottom on the first named tabs, the terminal portions of said U-shaped lines extending longitudinally with respect to the normal plane of said bottom.

3. A box of the character described comprising a foldable wall structure having portions provided with pairs of slits, the material between said slits being forced from the plane of the wall portion and separated intermediately of the ends of the slits to provide a pair of tabs having jagged meeting edges, said jagged meeting edges being mutually engaged whereby to prevent movement of the tabs back into the plane of the wall portion, and a bottom seating on said tabs.

4. A box of the character described comprising foldably connected wall sections, a bottom hingedly connected with one of the other wall sections, a seating projection for said bottom on one of the other wall sections, a holding projection on one of the wall sections above said seating projection and an upwardly extending latch flap on the bottom yieldably urged outward with respect to the bottom and adapted for latch engagement with the holding projection upon engagement of the bottom with the seating projection.

In testimony that I claim the foregoing I have hereunto set my hand at Sheboygan, in the county of Sheboygan and State of Wisconsin.

HENRY OPGENORTH.